US012723432B2

(12) United States Patent
Olivieri

(10) Patent No.: US 12,723,432 B2
(45) Date of Patent: Sep. 1, 2026

(54) MOUNTING SYSTEM FOR MOUNTING AN ELECTRONIC DEVICE ON A VEHICLE

(71) Applicant: Deere & Company, Moline, IL (US)

(72) Inventor: Pablo G. Olivieri, Long Beach, CA (US)

(73) Assignee: Deere & Company, Moline, IL (US)

( * ) Notice: Subject to any disclaimer, the term of this patent is extended or adjusted under 35 U.S.C. 154(b) by 32 days.

(21) Appl. No.: 18/462,926

(22) Filed: Sep. 7, 2023

(65) Prior Publication Data

US 2024/0229503 A1 Jul. 11, 2024

Related U.S. Application Data

(60) Provisional application No. 63/440,280, filed on Jan. 20, 2023, provisional application No. 63/437,495, filed on Jan. 6, 2023.

(51) Int. Cl.
*E05B 13/00* (2006.01)
*B60R 11/00* (2006.01)

(52) U.S. Cl.
CPC ............ *E05B 13/001* (2013.01); *B60R 11/00* (2013.01); *B60R 2011/004* (2013.01); *B60R 2011/0096* (2013.01)

(58) Field of Classification Search
CPC ......... E05B 13/001; E05B 5/06; B60R 11/00; B60R 2011/004; B60R 2011/0096; Y10T 70/7915; Y10T 70/5562
USPC .................................................. 70/2, 32, 77
See application file for complete search history.

(56) References Cited

U.S. PATENT DOCUMENTS 8,302,435 B2 * 11/2012 Burmesch ................ B60D 1/02 70/34
8,662,364 B2 * 3/2014 Vuillet ................ B60R 11/0264 224/276
12,000,171 B2 * 6/2024 Olivieri ................... E05B 5/006
2005/0000255 A1 * 1/2005 Wyers ...................... B60D 1/60 70/423
2010/0025561 A1 * 2/2010 Becker ................ B60R 11/0258 248/231.9
2012/0055967 A1 3/2012 Mcmillan
2020/0291674 A1 9/2020 Olivieri et al.

FOREIGN PATENT DOCUMENTS

EP 2149477 A2 2/2010

OTHER PUBLICATIONS

International Search Report and Written Opinion for corresponding International application No. PCT/US2023/073606 dated Jan. 3, 2024.
The International Search Report and the Written Opinion of the International Searching Authority issued in counterpart application No. PCT/US2023/73606, dated Jul. 3, 2025, 06 pages.

* cited by examiner

*Primary Examiner* — Suzanne L Barrett
(74) *Attorney, Agent, or Firm* — Harness, Dickey & Pierce, P.L.C.

(57) ABSTRACT

A mounting system includes a lock plate configured to be attached to a vehicle, the lock plate including loops, a hook including a first portion having a hook shape and a second portion having an opening, a lock configured to extend through the loops and the opening of the hook, and a device including a hump portion, wherein the hook is configured to secure the device to the vehicle via the lock plate by connecting the first portion of the hook to the hump portion of the device.

21 Claims, 9 Drawing Sheets

100
10
150
112
111
120
141
140

MOUNTING SYSTEM FOR MOUNTING AN ELECTRONIC DEVICE ON A VEHICLE

CROSS-REFERENCE TO RELATED APPLICATIONS

This application claims priority under 35 U.S.C. § 119(e) to U.S. Provisional Patent Application No. 63/437,495 filed Jan. 6, 2023 and U.S. Provisional Patent Application No. 63/440,280 filed Jan. 20, 2023, the entire contents of each of which are herein incorporated by reference.

BACKGROUND

Location-determining receivers, sensors and other removable electronic devices are commonly mounted on agricultural vehicles to provide position data, altitude data and/or motion data to a variety of precision agriculture applications. For example, a removable electronic device may comprise a location-determining receiver, such as a global navigation satellite system (GNSS) receiver which may be a global positioning system (GPS) receiver.

SUMMARY

Some example embodiments provide a mounting system for mounting an electronic device on a vehicle.

At least one example embodiment provides a mounting system including a lock plate configured to be attached to a vehicle, the lock plate including loops, a hook including a first portion having a hook shape and a second portion having an opening, a lock configured to extend through the loops and the opening of the lock bar, and a device including a hump portion, wherein the hook is configured to secure the device to the vehicle via the lock plate by connecting the first portion of the hook to the hump portion of the device.

At least one example embodiment provides a vehicle including a device including a hump portion and a mounting system configured to attach the device to the vehicle. The mounting system includes a lock plate configured to be attached to the vehicle, the lock plate including loops, a hook including a first portion having a hook shape and a second portion having an opening, and a lock configured to extend through the loops and the opening of the hook. The hook may be configured to secure the device to the vehicle via the lock plate by connecting the first portion of the hook to the hump portion of the device.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For the purposes of clarity, various dimensions of the drawings may have been exaggerated.

DETAILED DESCRIPTION

Figure 1A:
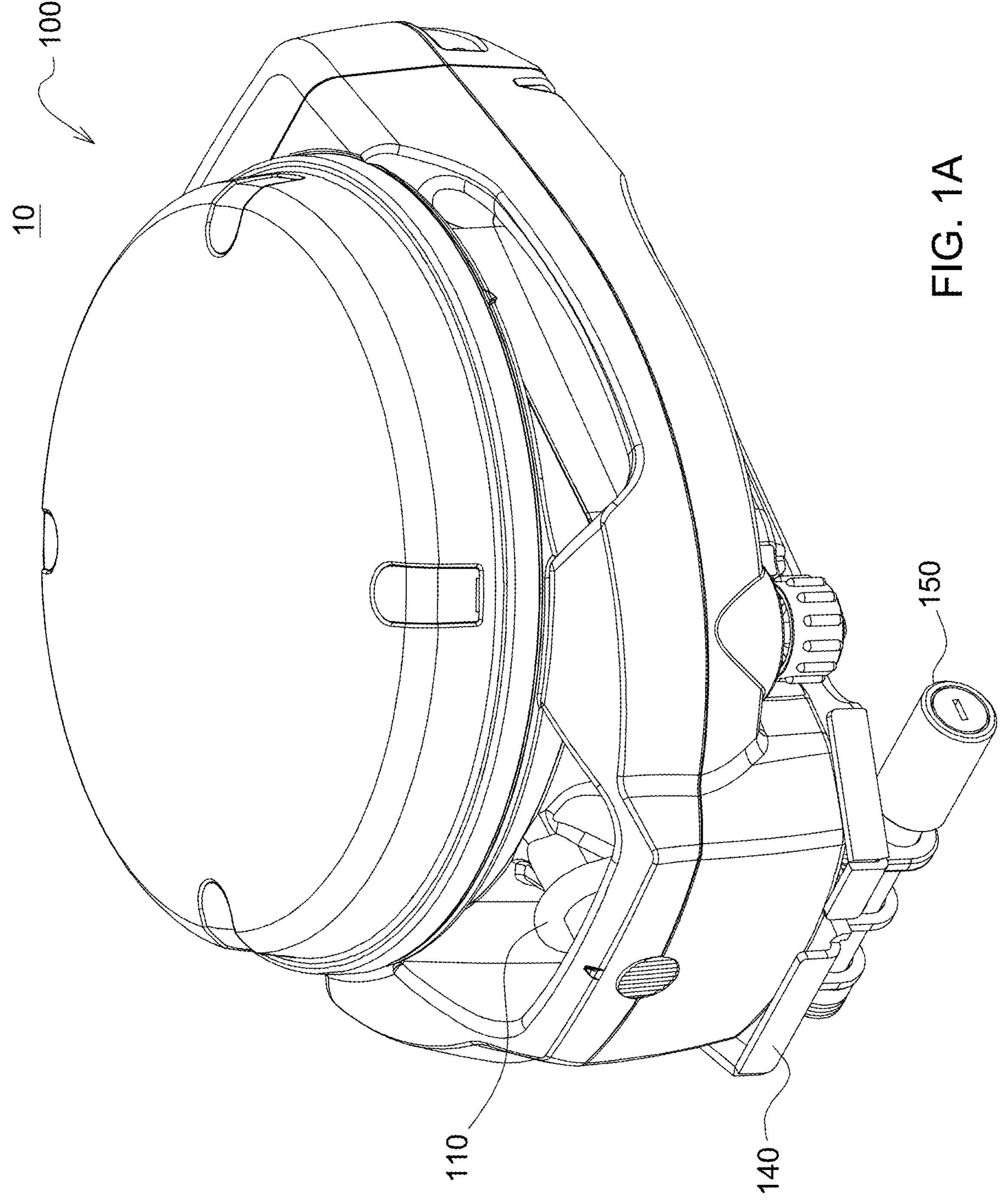
FIGS. 1A and 1B are perspective views of a mounting system according to example embodiments.

A removable electronic device mounted on a vehicle may be disconnected or removed from the vehicle by operation of a latch without security measures or theft deterrence. For instance, the latch without security measures may allow the owner of the vehicle or any unauthorized third party (e.g., an interloper or thief) to remove the electronic device from the vehicle. A mounting system including theft deterrence is disclosed in U.S. Application Publication No. 2020/0291674, filed Oct. 11, 2019, incorporated herein by reference in its entirety Example embodiments provide an improved mounting system for mounting a removable electronic device on a vehicle with greater security to prevent or discourage theft or unwanted removal of the removable electronic device.

At least one example embodiment provides a mounting system including a lock plate configured to be attached to a vehicle, the lock plate including loops, a hook including a first portion having a hook shape and a second portion having an opening, a lock configured to extend through the loops and the opening of the lock bar, and a device including a hump portion, wherein the hook is configured to secure the device to the vehicle via the lock plate by connecting the first portion of the hook to the hump portion of the device.

The lock may include a pin and a locking cap.

The pin may include a notched portion configured to be inserted into the locking cap.

The locking cap may include a key hole and the locking cap may be configured to release the pin via a key.

The hook may include a bent portion near a middle of the hook between the first portion and the second portion.

The loops may have an inner circumference that is the same as an inner circumference of the opening.

The pin may include a first portion having a first outer circumference larger than the inner circumference of the loops and a second portion having a second outer circumference smaller than the inner circumference of the loops.

The locking cap may have a third outer circumference equal to the first outer circumference.

The lock may be a padlock.

The first portion of the hook may be covered with rubber.

The bent portion of the hook may be bent at a 22° angle.

The lock plate may include a slit and the second portion of the hook may be configured to extend through the slit.

The mounting system may further include a mounting bracket configured to be attached to the device. The lock plate may be configured to be attached to the mounting bracket.

The mounting bracket may include first mounting holes and the lock plate may include second mounting holes. The first mounting holes may be configured to align with the second mounting holes, and the lock plate may be configured to attach to the mounting bracket via the first and second mounting holes.

The device may include a latch and the mounting bracket may be configured to attach to the device via the latch.

The first portion of the hook may have a circular shaped cross section and the second portion of the hook may have a rectangular shaped cross section.

The hook shape may have an inner circumference that is complementary with an outer circumference of the hump.

The hook shape may have an end departure angle of 14°.

The hump may be configured to protect a light pipe of the device.

The lock plate may include a cable guide configured to guide a cable of the device as the cable exits a device housing of the device.

The lock plate includes walls extending vertically from the lock plate, the walls configured to cover gaps between the lock plate and a bottom of the device.

Figure 1B:
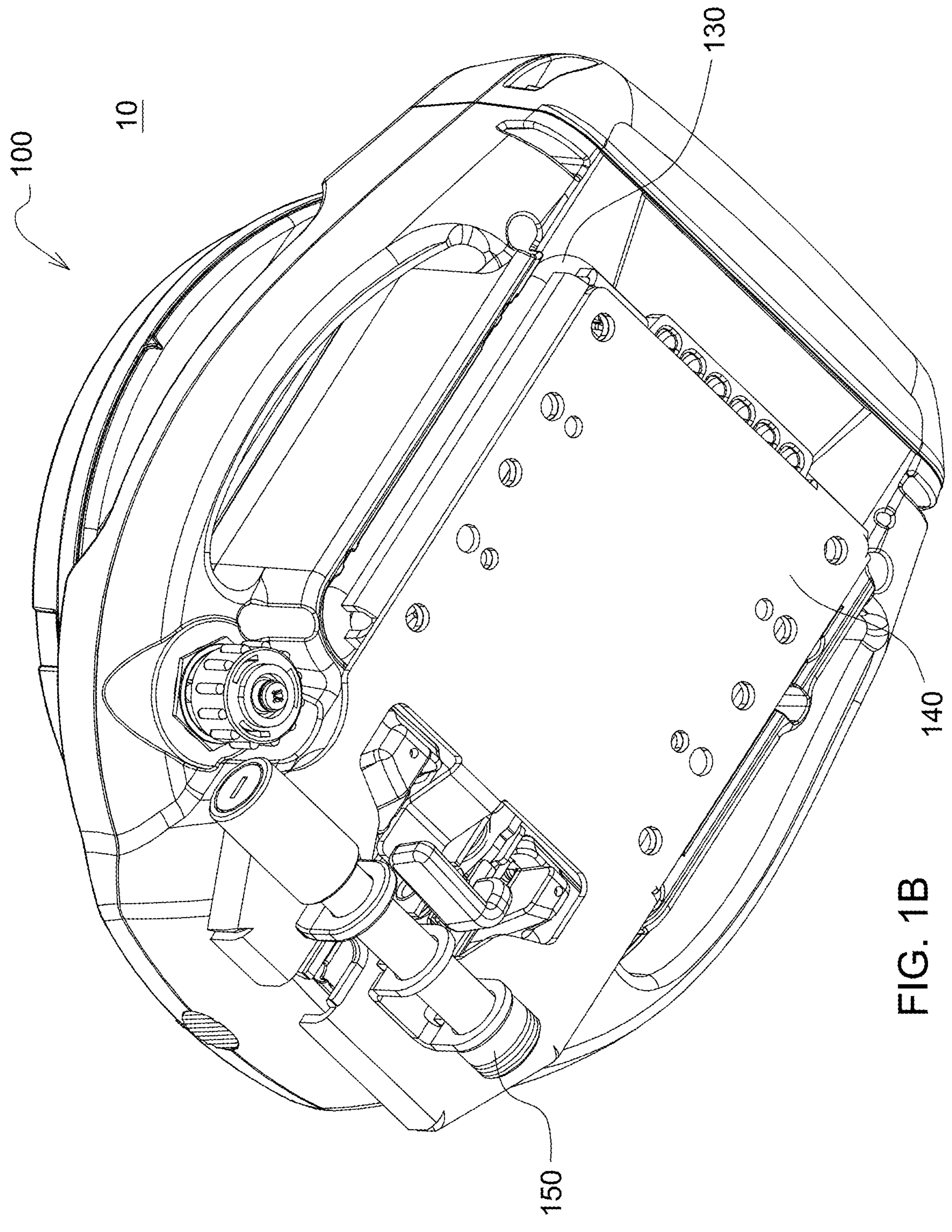

FIGS. 1A and 1B are perspective views of a mounting system according to example embodiments.

Referring to FIGS. 1A and 1B, a mounting system 10 comprises a device housing 100, a hook 110, a lock 150, a mounting bracket 130 and/or a lock plate 140 that is attachable to a vehicle 1 (shown in FIG. 7), such as a roof of a vehicle.

The device housing 100 may enclose an electronic device (not shown). The device housing 100 may be a housing for, for example, a global positioning satellite (GPS) receiver and/or any known receiver for a global navigation satellite system (GNSS). The electronic device may be described as including the device housing 100 (e.g., the device housing may be considered as part of the electronic device).

Figure 2A:
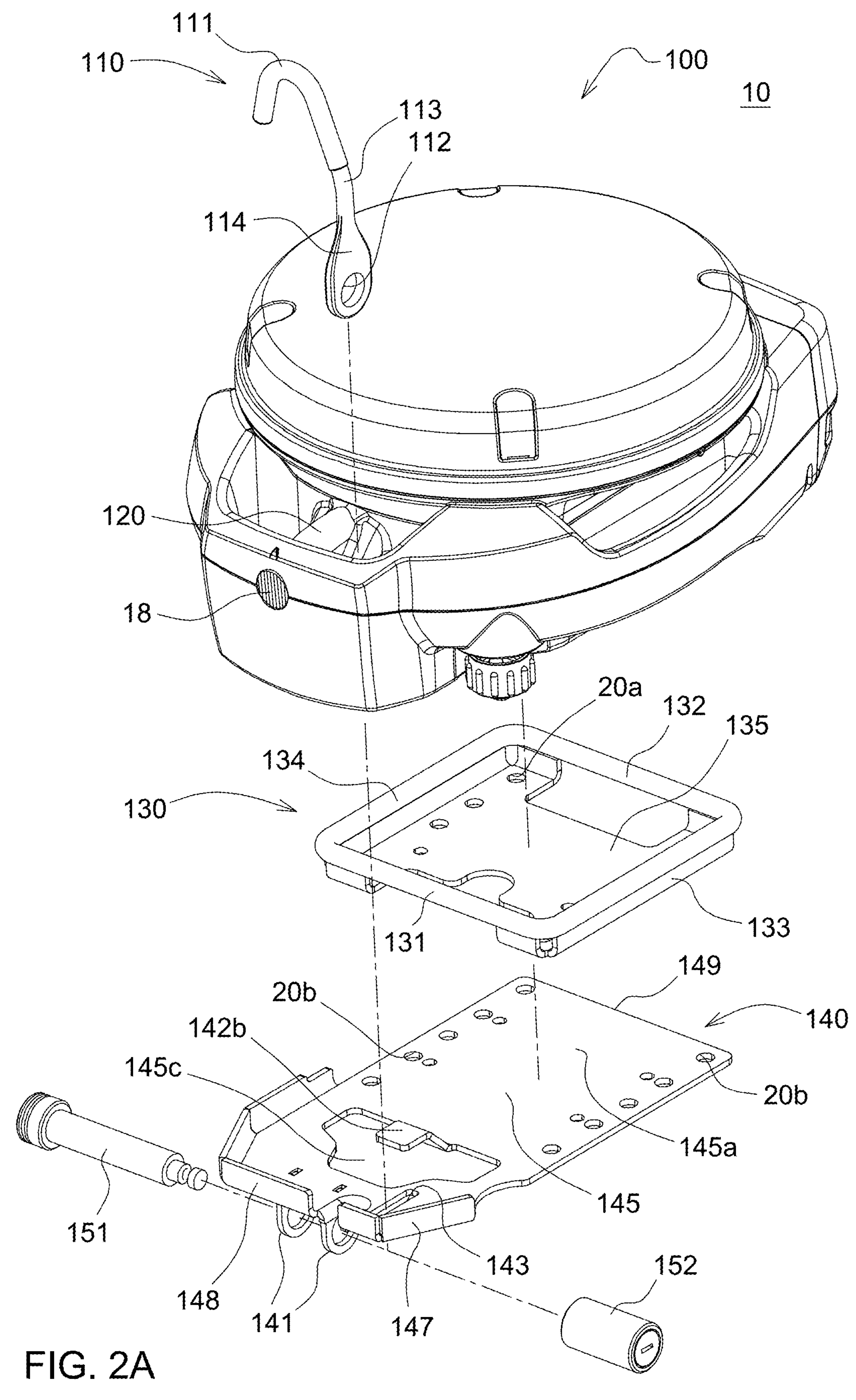
FIGS. 2A and 2B are exploded perspective views of a mounting system according to example embodiments.
Figure 2B:
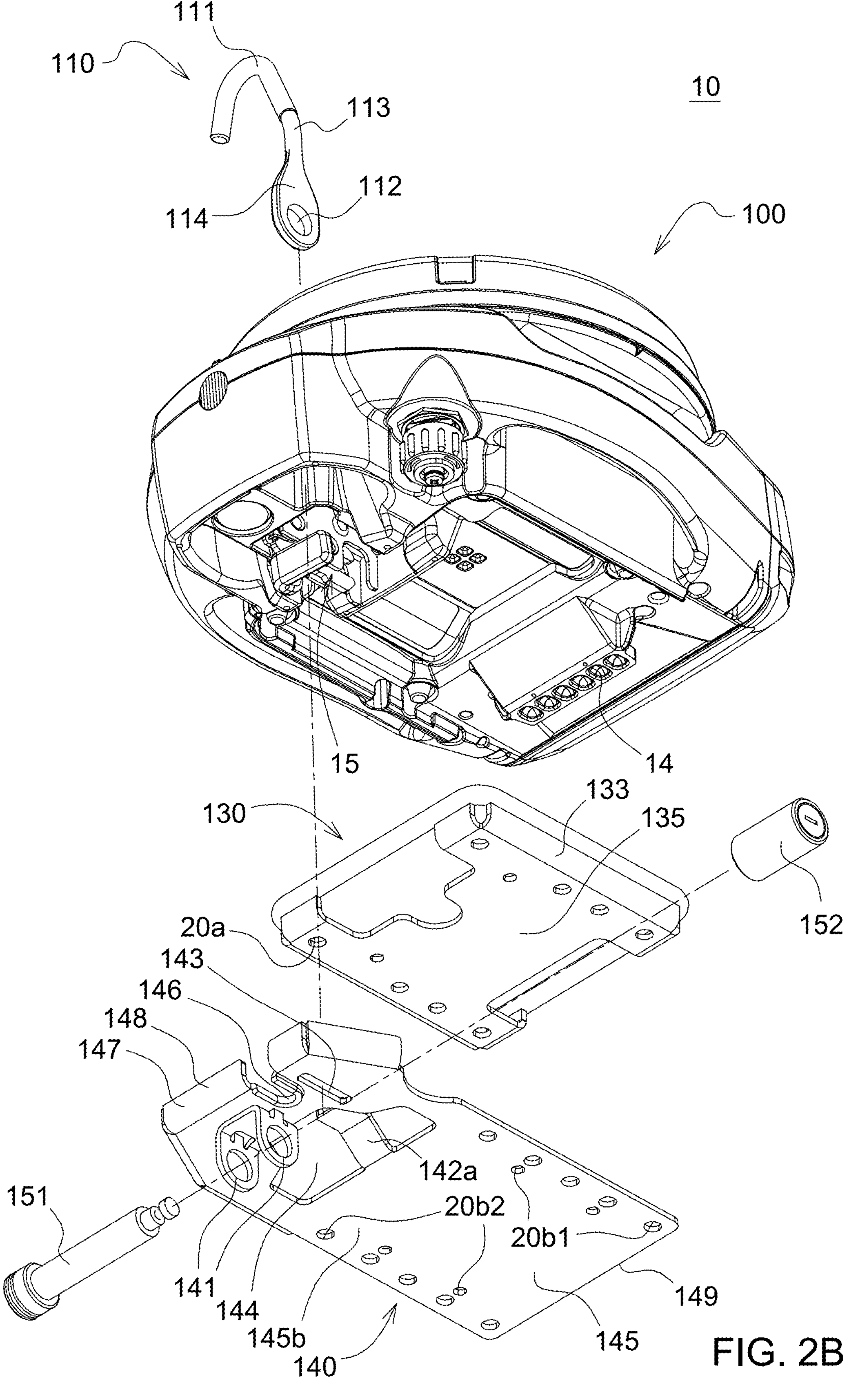

FIGS. 2A and 2B are exploded perspective views of a mounting system according to example embodiments.

Referring to FIGS. 2A and 2B, the device housing 100 may include a hump portion 120, an LED lens 18, a retainer 14, and/or a latch 15. The retainer 14 is configured to engage and/or rotate (at least partially) around an engaging member 132 of the mounting bracket 130. The hump portion 120 is configured to protect a light-pipe assembly 121 (seen in FIG. 4) of the electronic device. The light-pipe assembly 121 may be configured to carry an LED status from a GNSS receiver box (not shown) of the electronic device to the LED lens 18 at the front of the device.

The latch 15 will be described later with reference to FIG. 3.

The mounting bracket 130 may include a keeper 131, an engaging member 132, first and/or second sides 133 and/or 134, a first flange 135, and/or first mounting holes 20*a*.

The engaging member 132 is generally parallel to the keeper 131, although in some example embodiments the engaging member 132 or the keeper 131 may be curved; hence, the engaging member 132 and the keeper 131 may exist in a non-parallel configuration.

The engaging member 132 and keeper 131 are generally cylindrical or each has an interface or portion with a generally cylindrical cross section. The engaging member 132 and the keeper 131 may be connected by first and/or second sides 133 and/or 134 that are generally perpendicular to the engaging member 132 and the keeper 131 and are generally parallel to each other. However, in some example embodiments, the first and/or second sides 133 and/or 134 may be curved and therefore may exist in a non-parallel configuration.

According to example embodiments, the mounting bracket 130 may be symmetrical such that the engaging member 132 and the keeper 131 have substantially similar cross-sectional dimensions or configurations.

According to example embodiments, a first flange 135 is included in at least part of a spatial area bounded by the engaging member 132, keeper 131, and/or first and/or second sides 133 and/or 134. The first flange 135 may include first mounting holes 20*a* for attaching the mounting bracket 130 to the vehicle. The mounting bracket may be attached to the vehicle via, for example, bolts extending through the mounting holes 20*a*. The mounting bracket 130 may be composed of plastic, metal, alloy, polymer, composite material, fiber-reinforced plastic, fiber-reinforced polymer and/or any other suitable material.

Figure 3:
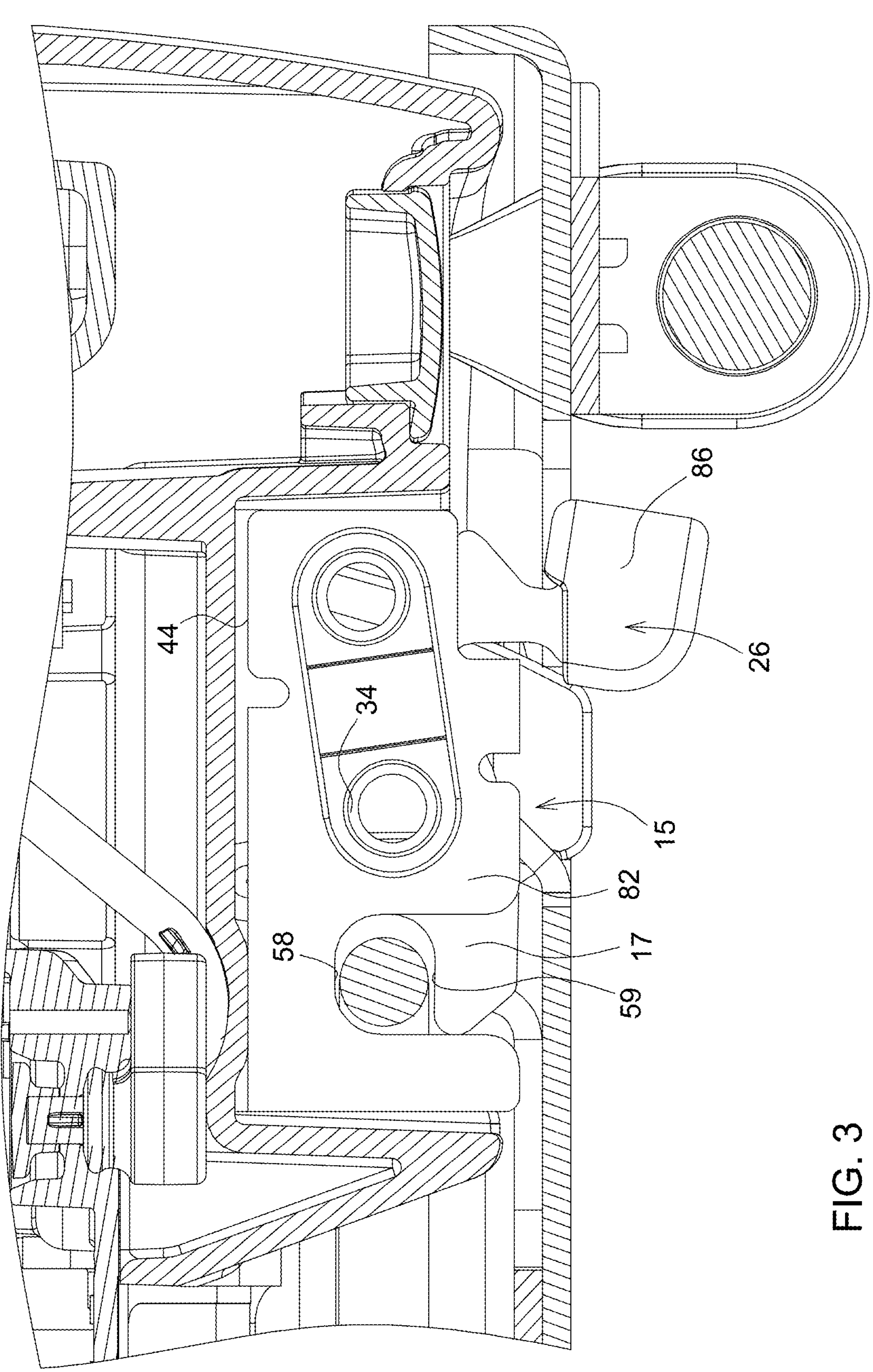
FIG. 3 is a cross section of a portion of a device housing including a latch, according to example embodiments.

FIG. 3 is a cross section of a portion of the device housing 100 including the latch 15.

The latch 15 comprises a frame 82, a rotor 17, and/or a lever (or handle) 26.

In some example embodiments, the rotor 17 of the latch 15 can rotate with respect to the frame 82 (e.g., hollow frame 82). The rotor 17 is secured to the device housing 100 via a primary shaft 34 (e.g., stationary rotor shaft, hollow rotor shaft or tubular rotor shaft). The handle 26 comprises a lever that terminates in a grip 86.

As shown in FIG. 3, the frame 82 may have a frame slot 58 configured to accept the keeper 131 of the mounting bracket 130. The frame slot 58 is coextensive with corresponding rotor slot 59 in the rotor 17.

The rotor 17 is configured to engage the keeper 131 and secure the device housing 100 to the mounting bracket 130 if the retainer 14 has engaged the engaging member 132.

The lever 26 (e.g., a handle) is arranged for controlling the latch 15 (or the rotor 17 of the latch 15) to engage or disengage the keeper 131. A user can operate the lever 26 to engage (e.g., attach) the device housing 100 to the mounting bracket 130 by the controllable latch 15 engaging the keeper 131. Conversely, a user can operate the lever 26 to disengage (e.g., detach) the device housing to the mounting bracket 130 by the controllable latch 15 engaging the keeper 131.

In some example embodiments, the lever 26 is positioned downward from the rotor 17 of the device housing 100.

In some example embodiments, the lever 26 is positioned in a recess 44 (e.g., indentation) of the device housing 100, or in a recess 44 in which the latch 15 resides.

Returning to FIGS. 2A and 2B, the lock plate 140 may include loops 141, a tab 142, a second flange 145, slit 143, a cable guide 146, walls 147, and/or second mounting holes 20*b*.

The cable guide 146 may be an opening at a front end 148 of the lock plate 140. For example, the cable guide 146 may be at an off-center position of a front end 148 of the second flange 145. The front end 148 of the lock plate 140 may be at an opposite end of the lock plate 140 from a back end 149 of the lock plate 140.

The cable guide 146 may have a horseshoe shape. The cable guide 146 may appear as a horseshoe cutout at the front end 148 of the second flange 145.

The cable guide 146 is configured to guide a cable 124 (shown in FIG. 7) of the electronic device as the cable exits the device housing 100. The cable guide 146 may provide a soft edge for the cable exiting the device housing 100 to reduce or prevent damage to the cable.

The walls 147 extend vertically from the second flange 145 at the front end 148 of the second flange 145 and at least a portion of the sides of the second flange 145. The sides of the second flange 145 may extend laterally from the front end 148 and the back end 149. For example, the walls 147 may be orthogonal to the second flange 145.

The walls 147 may include a gap. For example, there may be a gap in the walls 147 such that the walls 147 surround the opening in the front end 148 of the lock plate caused by the cable guide 146. The walls 147 may be configured to cover gaps between the lock plate 140 and a bottom of the device housing 100 when the lock plate is attached to the device housing 100, as may be seen in FIG. 1A. Therefore the walls 147 may reduce or prevent access (e.g., by a person and/or a tool) to the underside of the device housing 100.

The second mounting holes 20*b* of the lock plate 140 may be configured for attaching the lock plate 140 to the vehicle. For example, the second mounting holes 20*b* may be configured to line up with the first mounting holes 20*a* of the mounting bracket 130. For example, holes 20*b* may include a superset of the holes 20*a*. The holes 20*b* may be configured such that a first set 20*b*1 of the holes 20*b* aligns with the holes 20*a*.

In an alternate example embodiment, the lock plate 140 may be attached to the mounting bracket 130 differently from the configuration shown. For example, the lock plate 140 may be rotated 180 degrees with respect to the mounting bracket 130. The holes 20*b* may include a second set 20*b*2 of the holes 20*b* configured to align with the holes 20*a* in the rotated position so that the lock plate 140 may be attached to the mounting bracket 130 in either position.

The lock plate 140 and the mounting bracket 130 may be attached to the vehicle via the first and second mounting holes 20*a* and 20*b*. For example, the lock plate 140 and the mounting bracket may be attached to the vehicle via bolts extending through the first and second mounting holes 20*a* and 20*b*. For example, the lock plate 140 may be configured to be attached to the vehicle between the vehicle and the mounting bracket 130.

Figure 6:
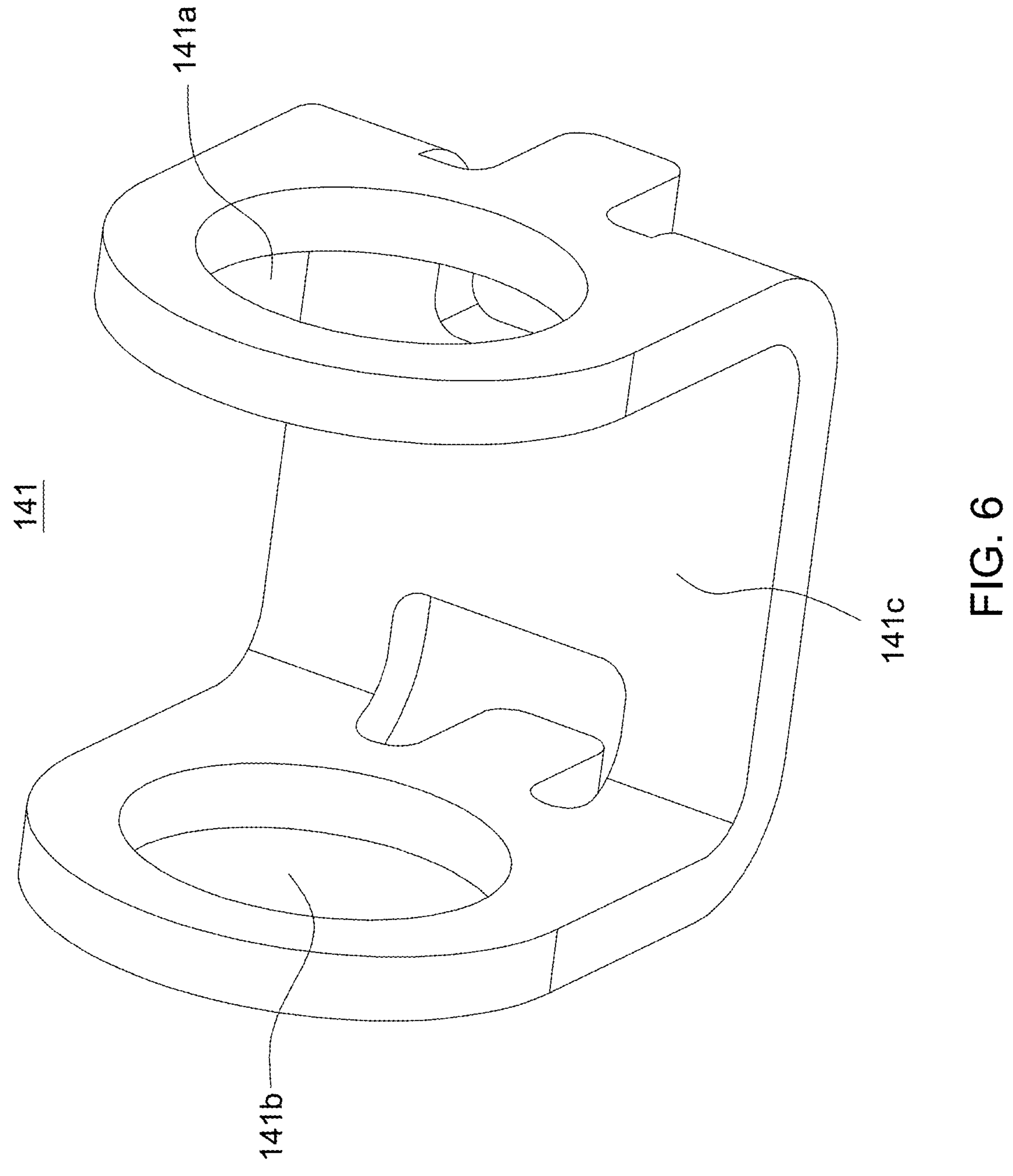
FIG. 6 is an illustration of the loops according to example embodiments.

FIG. 6 is an illustration of the loops according to example embodiments.

Referring to FIG. 6, the loops 141 include two circular openings 141*a* and 141*b* arranged parallel to each other. However, example embodiments are not limited thereto and the loops 141 may include a different number of circular openings. The circular openings 141*a* and 141*b* have a same circumference. The circular openings 141*a* and 141*b* extend from a base 141*c*. For example, the circular openings 141*a* and/or 141*b* may extend orthogonally from the base 141*c*. The circular openings 141*a* and 141*b* may be arranged on opposite ends of the base 141*c*.

Returning to FIGS. 2A-2B, the loops 141 may extend orthogonally from the second flange 145 at the front end 148 of the lock plate 140. For example, the loops 141 may extend orthogonally from a bottom surface of the second flange 145. The loops 141 may be positioned at a center portion of the front end 148 of the lock plate 140.

The loops 141 may be welded to the second flange 145. However, example embodiments are not limited thereto. In some example embodiment, the loops 141 may be integrally formed with the second flange 145. In some other example embodiments, the second flange 145 may include further slits configured for the circular openings 141*a* and 141*b* to extend through such that the base 141*c* remains at a top surface of the second flange 145 and the circular openings 141*a* and 141*b* extend downward from the bottom surface of the second flange 145.

The tab 142 may include a first portion 142*a* and a second portion 142*b*. The first portion 142*a* of the tab 142 may extend upwards from an upper surface 145*a* of the second flange 145. For example, the first portion 142*a* the tab 142 may extend upwards from the upper surface 145*a* of the second flange 145 at an angle. For example, first portion 142*a* of the tab 142 may extend from the upper surface 145*a* of the second flange at about a 45° angle.

The second portion 142*b* of the tab 142 may extend from the first portion 142*a* of the tab 142 such that the second portion 142*b* of the tab 142 is parallel with the upper surface 145*a* of the second flange 145. The second portion 142*a* of the tab 142 may overlap a cutout portion 144 of the second flange 145. The cutout portion 144 may be located near at a central position near the front end 148 of the second flange 145.

The tab 142 may be configured to block access (e.g., by a person and/or tool) to the screws that attach the latch 15 to the device housing 100 so that the latch may be prevented from being removed from the bottom of the device housing 100. For example, as shown in FIG. 1B, when the lock plate 140 is attached to the device housing 100, the tab 142 may be configured to cover screws securing the lever 26 to the device housing 100.

The slit 143 may be an oblong hole in the second flange 145. For example, the slit 143 may have a length in a direction from the front end 148 to the back end 149 of the lock plate 140 that is greater than a width of the slit 143. The length and the width of the slit 143 may be slightly larger than a length and a width of a second portion 114 of the hook 110, including an opening 112. For example, the slit may be configured such that the second portion 114 of the hook including the opening 112 extends through the slit 143 such that the opening 112 aligns with the loops 141.

The example embodiments illustrated herein show the mounting bracket 130 and the lock plate 140 as two separate units. However, example embodiments are not limited thereto. For example, the mounting bracket 130 and the lock plate 140 may be combined into one unit. For example, in some example embodiments, the lock plate 140 may include the keeper 131 and the engaging member 132.

When the lock plate 140 is attached to the device housing 100 and the vehicle, the hook 110 and the lock 150 may be attached to secure the device housing 100 to the lock plate 140. For example, attaching the hook 110 and the lock 150 may prevent a person from removing the device housing 100 from the vehicle.

As shown in FIGS. 2A-2B, the hook 110 may include a first portion 111 having a hook shape. For example, the first portion 111 of the hook 110 may be U-shaped. The first portion 111 of the hook 110 is configured to engage with the hump portion 120 of the device housing. For example, the first portion 111 of the hook 110 may be configured to surround a top portion of the hump portion 120 to secure the hump portion 120 from moving in an upward direction. An inner circumference of the hook shape may be the same as an outer circumference of a top portion of the hump portion 120.

The hook 110 may be comprised of, for example, a metal. The first portion 111 of the hook 110 may be covered with rubber. However, example embodiments are not limited thereto. For example, the entire hook 110 may be covered with rubber and/or a similar soft elastomeric material. Alternatively, no portion of the hook 110 may be covered with rubber and/or similar soft elastomeric material.

The hook 110 may include a second portion 114 on an opposite end of the hook 110 from the first portion 111. The second portion 114 may include an opening 112 configured to align with the loops 141 and engage with the lock 150. For example, the lock 150 may be configured to extend through the opening 112 of the hook 110 and the loops 141. A circumference of the opening 112 may be the same as a circumference of the loops 141.

The hook 110 may include a bent portion near a middle of the hook 110 between the first portion 111 and the second portion 114 of the hook 110. For example, the bent portion of the hook may be bent at about a 22° angle. The hook shape may have an inner radius that complements the geometry of the hump 120. For example, the hook shape may have an inner radius of about 11 mm. The hook shape may have a departure angle of about 14°.

The first portion 111 and the middle portion 113 of the hook 110 may have a cylindrical shape. For example, a cross section of the first portion 111 and the middle portion 113 of the hook 110 may have a circular shape with a diameter that is substantially consistent.

The second portion 114 of the hook 110 may be flattened when compared to the first section and the middle sections of the hook 110. For example, a cross section of the second portion 114 of the hook may have a rectangular shape. A length and a width of the cross section of the second section of the hook 110 may be slightly smaller than the length and width of the slit 143 such that the opening 112 fits through the slit 143.

The lock 150 may include a pin 151 and a locking cap 152. The pin 151 may include a wider portion at a first end and a narrower portion at a second end opposite from the first end. The pin 151 may further include a middle portion between the first and second end. The middle portion may have a width between the width of the first and second ends.

The narrower portion of the pin 151 may be configured to be inserted in the locking cap 152. For example, the narrower portion of the pin 151 may have a notch configured to engage with an inner circumference of the locking cap 152. When engaged, the pin 151 may lock into the locking cap 152. The locking cap 152 may include a key hole. For example, the locking cap 152 may be configured to disengage with the pin 151 by inserting a key in the key hole.

The locking cap 152 may have an outer circumference similar to or equal to a circumference of the first end of the pin 151. The locking cap may include a dust cap (not shown).

The pin 151 may be configured to be inserted into the loops 141 and the opening 112 in the second portion 114 of the hook 110. For example, the outer circumference of the middle portion of the pin 151 may be configured to fit inside an inner circumference of the opening 112 of the hook 110 and an inner circumference of the loops 141. For example, the inner circumference of the opening 112 of the hook 110 and the inner circumference of the loops 141 may be the same or similar. The outer circumference of the middle portion 113 of the hook 110 may be smaller than the inner circumference of the opening 112 of the hook 110 and the inner circumference of the loops 141.

The outer circumference of the locking cap 152 and the outer circumference of the first end of the pin 151 may be wider than the inner circumference of the opening 112 of the hook 110 and the inner circumference of the loops 141 so that, when the pin 151 is inserted through the opening 112 of the hook 110 and the loops 141 and locked into place in the locking cap 152, the lock 150 cannot be removed from the loops 141 or the hook 110. This configuration may be seen in FIGS. 1A-1B.

In this configuration, the first portion 111 of hook 110 secures the hump portion 120 and the second portion 114 of the hook 110 is secured to the lock plate 140 via the loops 141 and the lock 150. The lock plate 140 may be configured to be attached to, for example, a vehicle, a machine, and/or a base station, etc. Examples of a vehicle may include, but are not limited to, agricultural implements. Examples of a base station may include, but are not limited to, a tower attached to a building or similar structure. Therefore, the electronic device may be secured to the vehicle via the hump portion 120, the hook 110, and the lock plate 140.

The lock 150 is illustrated as a rod shape including the pin 151 and the locking cap 152. However, example embodiments are not limited thereto and the lock 150 may alternatively be any type of lock. For example, the lock 150 may be a padlock. In a case where the lock 150 is the padlock, the lock 150 is configured such that the shackle of the padlock extends through the loops 141 and the opening 112 to hold the hook 110 in place.

Figure 4:
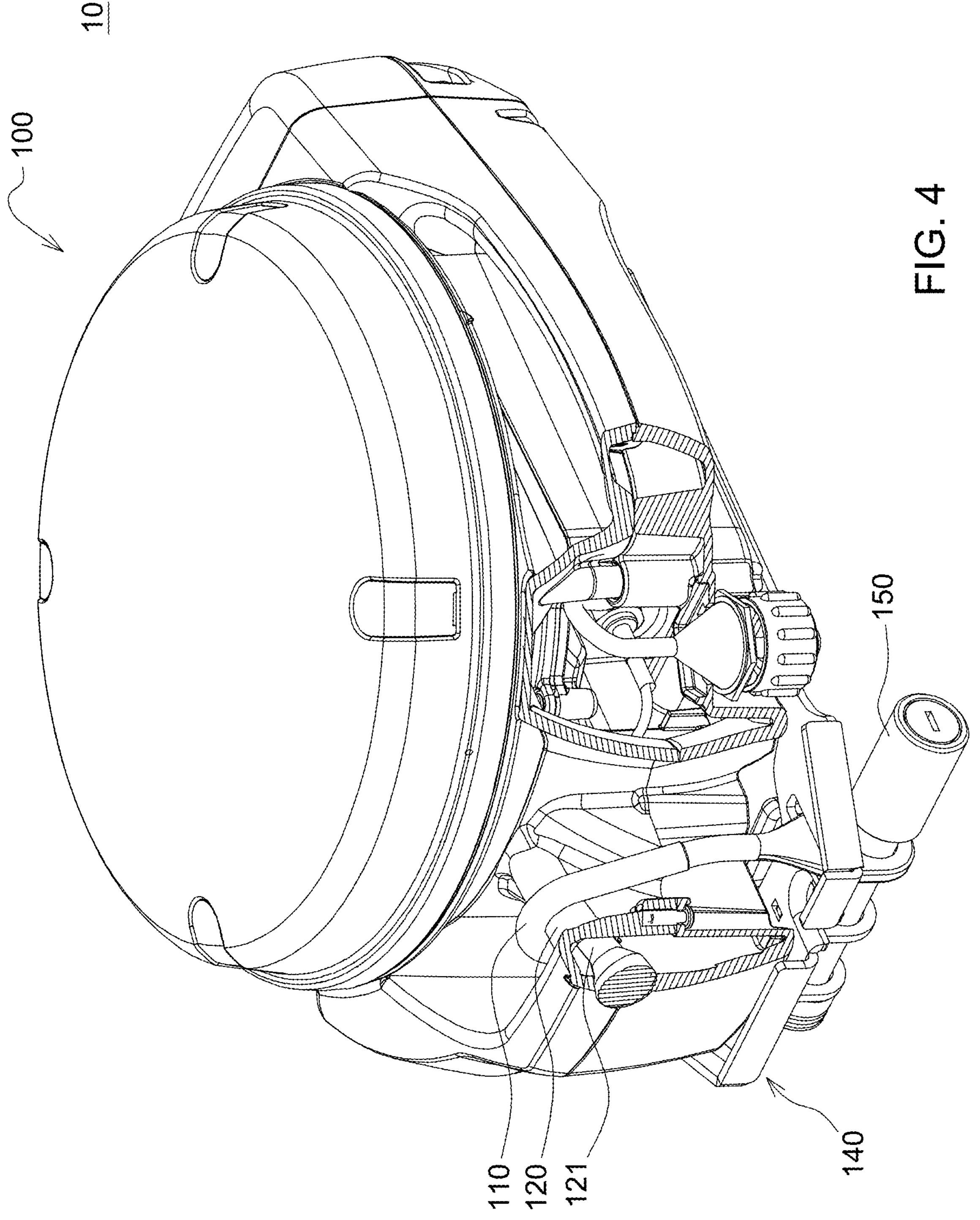
FIG. 4 is a cross section of a mounting system according to example embodiments.

FIG. 4 is a cross section of a mounting system according to example embodiments.

Referring to FIG. 4, the hook shape of the hook 110 is configured to make contact with the hump 120. As seen in FIG. 4, the inner circumference of the hook shape has a complementary shape as an outer circumference of a top portion of the hump 120.

As shown in FIG. 4, the hump 120 protects the light-pipe assembly 121. For example, the hump 120 of the device housing 100 may cover the light pipe assembly 121.

The hole 112 is shown in FIG. 4 extending through the slit 143 and engaged with the lock 150.

Figure 5:
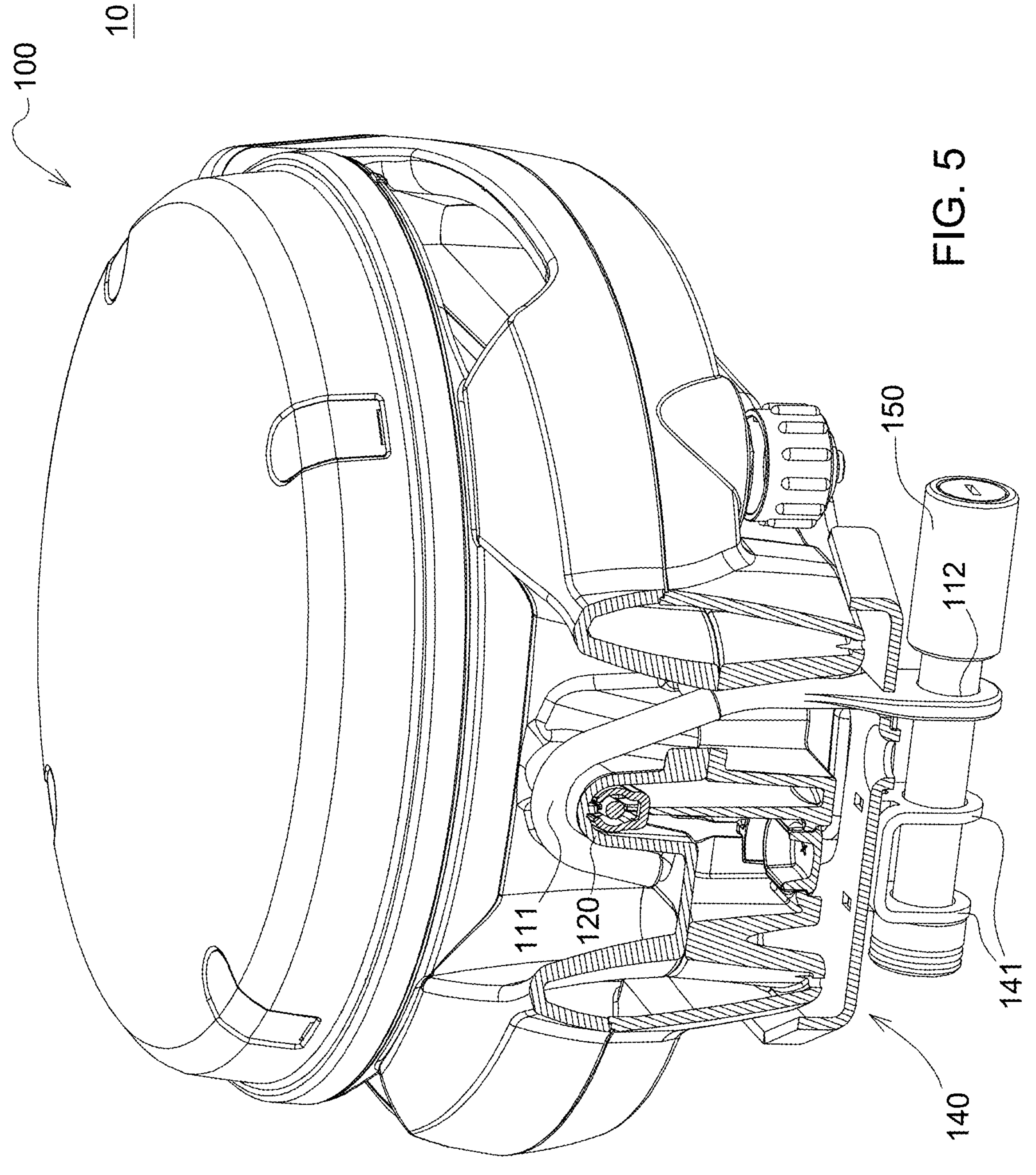
FIG. 5 is a cross section of a mounting system according to example embodiments.

FIG. 5 is a cross section of a mounting system according to example embodiments.

Referring to FIG. 5, the first portion of the hook 110 is shown engaged with the hump 120 of the device housing 100. The second portion 114 of the hook 110 is shown extending through the slit 143 of the lock plate 140. The lock 150 is shown extending through the loops 141 of the lock plate 140 and the opening 112 of the hook 110.

Thus, as shown in FIG. 5, the hook shape of the first portion 111 of hook 110 secures the hump portion 120 and the second portion 114 of the hook 110 is secured to the lock plate 140 via the loops 141 and the lock 150. The lock plate 140 may be configured to be attached to, for example, a vehicle. Therefore, the electronic device may be secured to the vehicle via the hump portion 120, the hook 110, and the lock plate 140. Therefore, the mounting system 10 according to example embodiments may secure the electronic device to the vehicle with greater security to prevent or discourage theft or unwanted removal of the removable electronic device.

Figure 7:
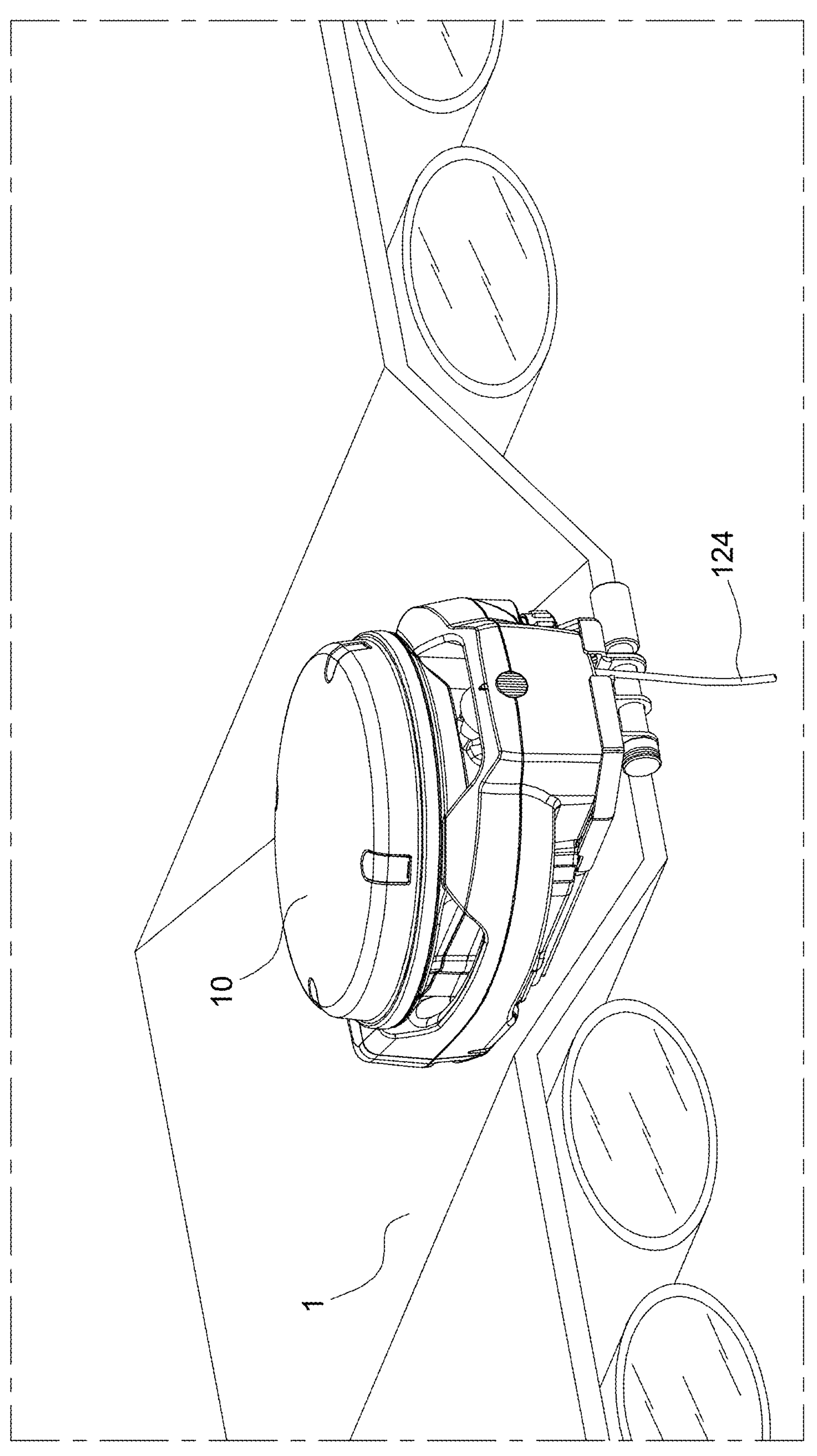
FIG. 7 is an illustration of the mounting system attached to a vehicle according to example embodiments.

FIG. 7 is an illustration of the mounting system attached to a vehicle according to example embodiments.

Referring to FIG. 7, the mounting system 10 is shown attached to (e.g., mounted on) a vehicle 1.

It will be understood that when an element is referred to as being "connected" or "coupled" to another element, it may be directly connected or coupled to the other element or intervening elements may be present. As used herein the term "and/or" includes any and all combinations of one or more of the associated listed items.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

When the words "about" and "substantially" are used in this application in connection with a numerical value, it is intended that the associated numerical value include a tolerance of ±10% around the stated numerical value, unless otherwise explicitly defined. Further, regardless of whether numerical values are modified as "about" or "substantially," it will be understood that these values should be construed as including a of ±10% around the stated numerical value.

The invention claimed is:

1. A mounting system for an electronic device, the mounting system comprising:
- a lock plate configured to be attached to a vehicle, the lock plate including loops extending downwardly from a flat portion of the lock plate;
- a hook including a first portion having a hook shape and a second portion having an opening, the hook shape having an inner circumference that is complementary with a hump portion of a housing of the electronic device;
- and a lock configured to extend through the loops and the opening of the hook,
- wherein the hook is configured to secure the electronic device to the vehicle via the lock plate by connecting the first portion of the hook to the hump portion of the housing and aligning the opening of the hook with the loops of the lock plate to receive the lock.

2. The mounting system of claim 1, wherein the lock includes a pin and a locking cap.

3. The mounting system of claim 2, wherein the pin includes a notched portion configured to be inserted into the locking cap.

4. The mounting system of claim 3, wherein the locking cap includes a key hole and the locking cap is configured to release the pin via a key.

5. The mounting system of claim 1, wherein the hook includes a bent portion near a middle of the hook between the first portion and the second portion.

6. The mounting system of claim 1, wherein the loops have an inner circumference that is the same as an inner circumference of the opening.

7. The mounting system of claim 6, wherein
- the lock includes a pin and a locking cap, and
- the pin includes a first portion having a first outer circumference larger than the inner circumference of the loops and a second portion having a second outer circumference smaller than the inner circumference of the loops.

8. The mounting system of claim 7, wherein the locking cap has a third outer circumference equal to the first outer circumference.

9. The mounting system of claim 1, wherein the lock is a padlock.

10. The mounting system of claim 1, wherein the first portion of the hook is covered with rubber.

11. The mounting system of claim 5, wherein the bent portion of the hook is bent at a 22° angle.

12. The mounting system of claim 1, wherein
- the lock plate includes a slit, and
- the second portion of the hook is configured to extend through the slit.

13. The mounting system of claim 1 further comprising a mounting bracket configured to be attached to the electronic device, the lock plate configured to be attached to the mounting bracket.

14. The mounting system of claim 13, wherein
- the mounting bracket includes first mounting holes and the lock plate includes second mounting holes,
- the first mounting holes are configured to align with the second mounting holes, and
- the lock plate is configured to attach to the mounting bracket via the first and second mounting holes.

15. The mounting system of claim 13, wherein
- the electronic device includes a latch, and
- the mounting bracket is configured to be attached to the electronic device via the latch.

16. The mounting system of claim 1, wherein the first portion of the hook has a circular shaped cross section and the second portion of the hook has a rectangular shaped cross section.

17. The mounting system of claim 1, wherein the hook shape has an end departure angle of 14°.

18. The mounting system of claim 1, wherein the hump portion is configured to protect a light pipe of the electronic device contained within the hump portion.

19. The mounting system of claim 1, wherein the lock plate includes a cable guide configured to guide a cable of the electronic device as the cable exits a device housing of the electronic device.

20. The mounting system of claim 1, wherein the lock plate includes walls extending vertically from the lock plate, the walls configured to cover gaps between the lock plate and a bottom of the electronic device.

21. A vehicle comprising:
- an electronic device including a housing having a hump portion; and
- a mounting system configured to attach the electronic device to the vehicle, the mounting system including,
  - a lock plate configured to be attached to the vehicle, the lock plate including loops,
  - a hook including a first portion having a hook shape and a second portion having an opening, the hook shape having an inner circumference that is complementary with an outer circumference of the hump portion, and
  - a lock configured to extend through the loops and the opening of the hook,
- wherein the hook is configured to secure the electronic device to the vehicle via the lock plate by connecting the first portion of the hook to the hump portion of the housing and aligning of the book with the loops of the loc plate to receive the look.

* * * * *